(12) United States Patent
Zhang et al.

(10) Patent No.: US 12,731,450 B2
(45) Date of Patent: Sep. 8, 2026

(54) IDENTITY MANAGEMENT SYSTEM BASED ON ROLE

(71) Applicants: DENSO International America, Inc., Southfield, MI (US); DENSO CORPORATION, Kariya-city (JP)

(72) Inventors: Yu Zhang, Farmington Hills, MI (US); Akira Sakashita, Plano, TX (US); Kodai Yamaura, Lewisville, TX (US); Jeffrey Berg, Birmingham, MI (US); Shazaan Bahrainwala, Shoreline, WA (US); Chris Lorenzo, The Colony, TX (US); Johanne Paguio, Wylie, TX (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 88 days.

(21) Appl. No.: 18/744,818

(22) Filed: Jun. 17, 2024

(65) Prior Publication Data

US 2025/0384725 A1 Dec. 18, 2025

(51) Int. Cl.
*G07C 9/00* (2020.01)
*B60R 25/04* (2013.01)

(52) U.S. Cl.
CPC .......... *G07C 9/00571* (2013.01); *B60R 25/04* (2013.01); *G07C 2209/02* (2013.01); *G07C 2209/62* (2013.01)

(58) Field of Classification Search
None
See application file for complete search history.

(56) References Cited

U.S. PATENT DOCUMENTS 9,043,898 B2 5/2015 Fok Ah Chuen et al.
11,206,278 B2 12/2021 Veeramany et al.
11,527,121 B2 * 12/2022 Johnson ............ G07C 9/00571
12,315,319 B2 * 5/2025 Shenoi ................ G06V 40/168
2010/0214083 A1 8/2010 McNay
2019/0080538 A1 3/2019 Shahidi
2022/0301372 A1 9/2022 Trapani et al.

FOREIGN PATENT DOCUMENTS

JP 2024046858 A 4/2024
WO WO-2025073381 A1 * 4/2025 .............. G07C 9/30

* cited by examiner

*Primary Examiner* — Davetta W Goins
(74) *Attorney, Agent, or Firm* — Harness, Dickey & Pierce, P.L.C.

(57) ABSTRACT

An identity management system and method for operating the same includes assigning a role for a user, requesting access for a function of an access controller, selecting identification criteria for the function, determining identification criteria for enabling the function for the role, determining an identity of the user using the identification criteria at an arbitration system and allowing access based upon identifying the user and when identity corresponds to the identification criteria for the role.

20 Claims, 8 Drawing Sheets

IDENTITY MANAGEMENT SYSTEM BASED ON ROLE

FIELD

The present disclosure relates generally to an identity management system and, more specifically, to methods and systems for providing accessing function of a vehicle or building based on identity and roles.

BACKGROUND

This section provides background information related to the present disclosure which is not necessarily prior art.

Identity systems are used for many applications including in vehicles and buildings. Various types of identity systems are available depending upon the application. Identity systems include biometric systems that include but are not limited to facial recognition systems and voice recognition systems. Identities may also be provided using various types of devices such as a mobile device with an access identifier stored therein, a badge that is assigned to a user, keypad access and the like. The identity systems may be used both in buildings and in vehicles.

In vehicles and buildings, various functions may be enabled with different types of access. With different types of identity systems, efficiently managing the system securely and efficiently is important.

SUMMARY

This section provides a general summary of the disclosure, and is not a comprehensive disclosure of its full scope or all of its features.

The present disclosure provides a method and system for managing and orchestrating different functions for a vehicle or building based on user roles to allow a balance of security and efficiency.

In one aspect of the disclosure, a method for operating an identity management system includes assigning a role for a user, requesting access for a function of an access controller, selecting identification criteria for the function, determining identification criteria for enabling the function for the role, determining an identity of the user using the identification criteria at an arbitration system and allowing access based upon identifying the user and when identity corresponds to the identification criteria for the role.

In another aspect of the disclosure, an access controller includes a processor and a non-transitory computer-readable medium including machine-readable instructions that are executable by the processor. The machine-readable instructions include assigning a role for a user, receiving an access request signal for a function; selecting identification criteria for the function, determining identification criteria for enabling the function for the role, determining an identity of the user using the identification criteria at an arbitration system and allowing access based upon identifying the user and when identity corresponds to the identification criteria for the role.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
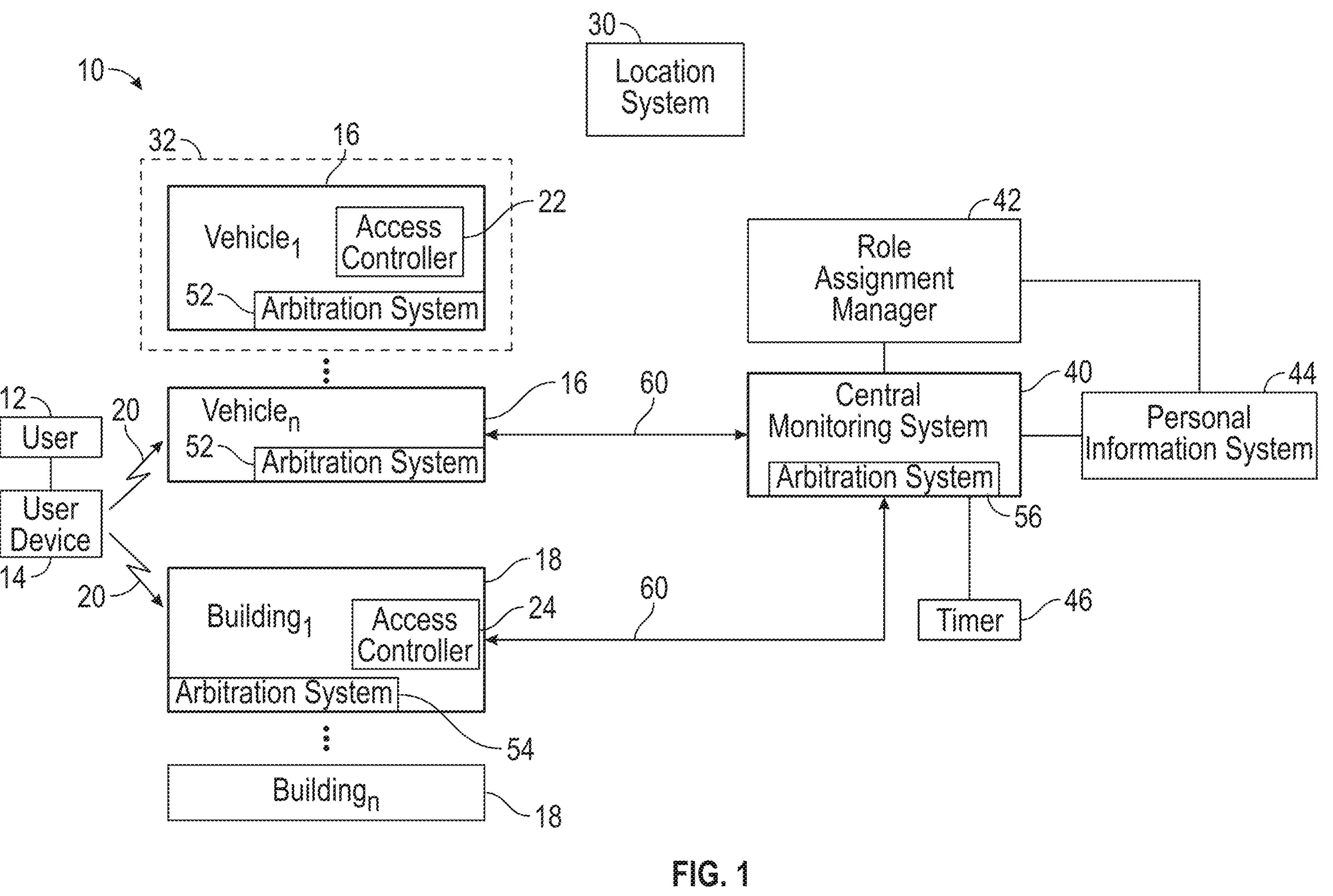
FIG. 1 is a high level block diagrammatic view of an identity system according to the present disclosure.

Referring now to FIG. 1, a high level block diagrammatic view of an identity system 10 is set forth. The identity system 10 is used to identify the identity of a user 12 that may be associated with a user device 14. The user 12 may have various biometric characteristics that are used to identify the identity of the user 12 without a user device 14. For example, the user may have fingerprints, facial features and voice features that are used to enable access to a vehicle 16 and/or a building 18. In this example, a number of vehicles 16 and a number of buildings 18 are provided. The group of vehicles 16 may be referred to as a fleet. The group of buildings may be part of a company or under management control of a security company.

A user device 14 may also be used to access the vehicles 16 and/or the buildings 18. The user device 14 may generate identity communication signals 20 that are used by the vehicles 16 or the buildings 18 to allow access through an access controller 22 within the vehicle 16 or an access controller 24 within a building as will be described in greater detail below. The user device 14 may include biometric systems that allow access to the vehicles 16 or the buildings 18. However, the vehicles 16 or the buildings 18 may also include their own biometric access systems. Details of the user device 14, the vehicles 16 and the buildings 18 are provided in greater detail below.

A location system 30 may also be in communication with the vehicles 16. The location system 30 may allow the geographic position 32 of the vehicle 16 to be determined. For example, the location system 30 may allow the vehicle 16 to determine the precise geographic position 32 to determine whether the vehicle 16 is within a geo-fenced area. The location system 30 may be one or a combination of different types of systems including a global positioning system, a cellular telephone system that is used for triangulation and other types of global navigation systems. The location system 30 may also be used to determine the location of the user device 14 using similar techniques.

Although the vehicle 16 and the building 18 may be controlled individually, a central monitoring system 40 may also be used to provide and control access to the vehicles 16 and buildings 18 by generating control signals.

A role assignment manager 42 may be used to assign roles to various users 12 or user devices 14. The role assignment manager 42 may be coupled to a personal information system 44. The personal information system 44 is used to store a personal and/or user device identifier and various personal information associated with the user for use in the identity system. The personal information may include a name, an assigned identifier, biometric data and the role. The role may have identification criteria associated therewith. For example, different systems such as facial recognition, fingerprint recognition, voice recognition, a badge identifier, and a device identifier may be associated with a role to allow access together or in combination. The identification criteria may change based on the status of the vehicle or building. The role may allow various functions to be enabled or disabled. By providing a role, various functions may be enabled without having to assign every single role to the user.

The central monitoring system 40 may also be associated with a timer 46. The timer 46 may be used to time various events. That is, certain functions may also be available during certain time periods in a day.

The vehicle 16 may have an arbitration system 52. The building 18 may have an arbitration system 54. The central monitoring system may have an arbitration system 56. The arbitration systems 52-56 are used to verify the identity in the various types of identity systems and arbitrate or allow access based upon the different types of identification criteria and the associated identifier systems. The role of the arbitration system will be described in greater detail below. The arbitration systems 52 and 54 are provided when no arbitration system is used for determining the identity of the users in the arbitration system 56 of the central monitoring system. The signals may be communicated through a network 60 such as a wire to wireless network to communication between the vehicles 16 and buildings 18 to the central monitoring system 40. The network 60 may be a wired or wireless system for communicating identity signals. The network 60 may be used for communicating arbitration signals and identity signals from the arbitration systems 52, 54 to the central monitoring system 40 and the arbitration system 56.

Figure 2:
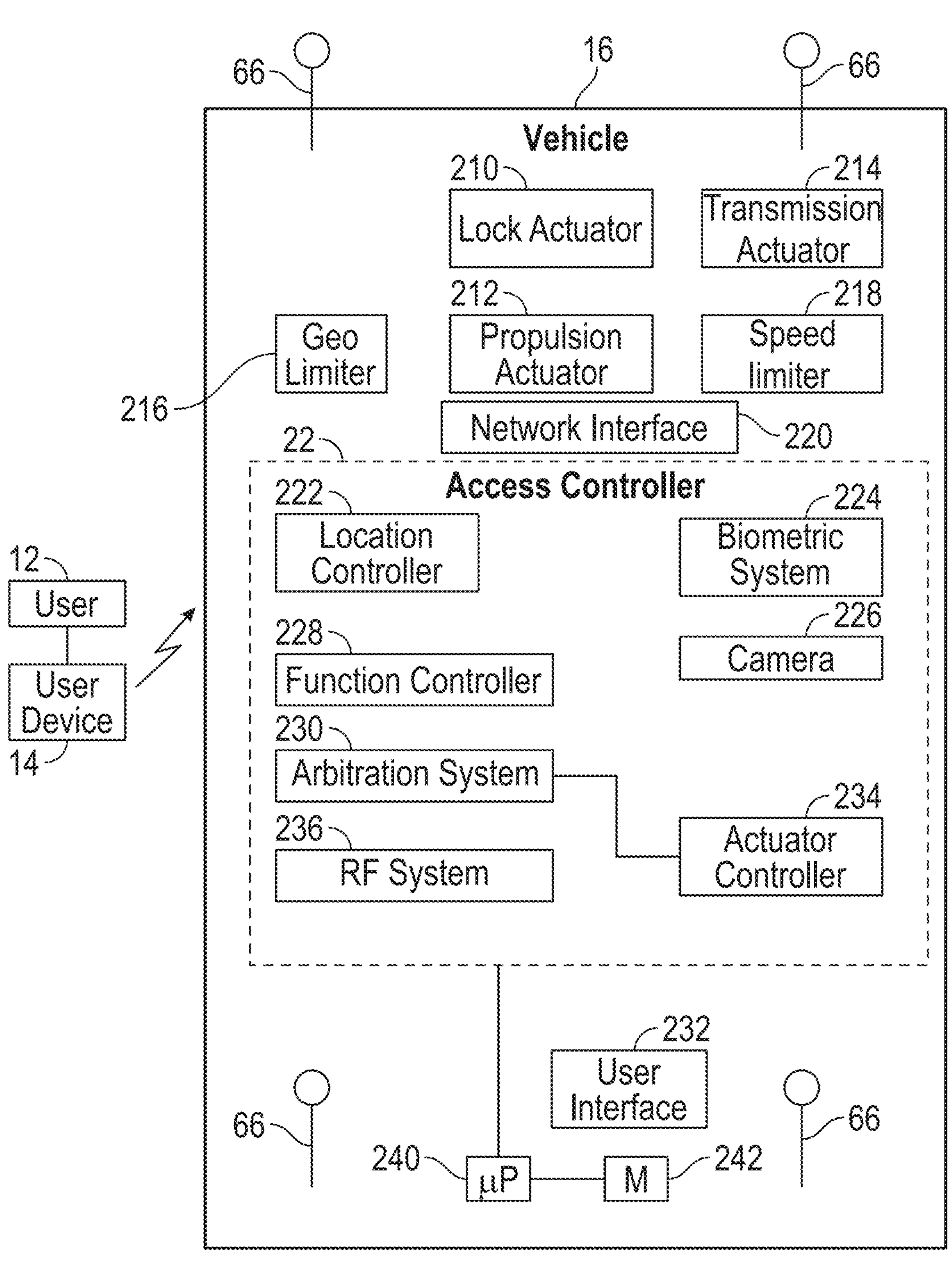
FIG. 2 is a block diagrammatic view of a vehicle of FIG. 1.

Referring now to FIG. 2, details of the control system of the vehicle 16 are set forth in further detail relative to a user 12 and a user device 14. Although the user 12 and user device 14 are illustrated outside of the vehicle 16, several functions may be available or performed from within the vehicle 16. The vehicle 16 may be in communication with the user device 14 through the anchors or antennas 66.

The vehicle 16 has many functions that may be enabled, limited, or made accessible through the access controller 22. For example, the vehicle 16 may have a lock actuator 210 used for actuating one or more locks of a vehicle. The locks of the vehicle may include door locks, a hood or frunk lock, a trunk lock, a tailgate lock or a compartment lock. An example of a compartment is a toolbox in a bed of a truck or a bulkhead door of a delivery vehicle. The lock actuator 210 may open or unlock a lock to allow the door to be opened.

The vehicle may also include a propulsion actuator 212. If the vehicle is an engine controlled vehicle, the propulsion actuator 212 may be a switch or other electronic mechanism to allow the vehicle to move. If the vehicle is a battery electric vehicle, the propulsion actuator 212 may allow connection between the high voltage battery and the electric motors of the vehicle. A hybrid electric vehicle has a combination of an engine and a battery, both of which may be enabled by the propulsion actuator 212. A transmission actuator 214 may be used to engage the drivetrain of the vehicle. The transmission actuator may be a switch or lever used to engage a gear. For example, the transmission actuator 214 may be a shift lever that allows the vehicle transmission to be moved from a park position to a drive or reverse position.

A geometric limiter 216 may enable or disable various functions of the vehicle based upon the geographic location. For example, the geographic limiter 216 may allow certain types of access within a geo-fenced area. The geographic limiter 216 may also prevent the vehicle from leaving a geographic area.

A speed limiter 218 is also provided for limiting the vehicle speed. The speed limiter 218 may enable full access or limit access to the full range and the ability of the propulsion system in terms of achieving a desired speed.

A network interface 220 may be used to communicate through a network. For example, the network interface 220 may also allow the vehicle to communicate through a cellular system. The vehicle 16 may communicate through the network interface 220 with the central monitoring system 40 to enable, disable, or to receive data from the personal information system 44. The network interface 220 may allow the arbitration system 56 of the central monitoring system to enable various functions of the vehicle. Likewise, the central monitoring system 40 may be used to assign and communicate various roles for various users that may be updated through the network interface 220. Likewise, the network interface 220 may be used to communicate identifier signals when identifiers beyond the capabilities of the vehicle are to be screened. The vehicle 16 has the access controller 22 as mentioned above in FIG. 1. The access controller 22 includes a location controller 222 that is used to determine the location of the vehicle 16 based on various location systems 30 as illustrated in FIG. 1. The location controller 222 may communicate with the geographic limiter 216 to limit various functions based upon the position of the vehicle 16.

The access controller 22 may be associated with a biometric system 224. The biometric system 224 may be associated with a camera 226 to determine some of the biometrics. The biometric system 224, in conjunction with the camera 226, may identify facial features as a facial recognition system. The biometric system 224 may also include a fingerprint identification system or voice recognition system.

The camera 226 may also be used for other functions of the vehicle including occupant detection and occupant recording. In a commercial delivery vehicle, unauthorized access may be recorded by way of the camera 226.

A function controller 228 may also be disposed within the access controller 22. The function controller 228 may control various functions of the vehicle including those illustrated at elements 210-218. Other functions the function controller 228 may control include but are not limited to changing the volume of the radio, accessing storage compartments within the vehicle, unlocking or locking a door, accessing a trunk or frunk, accessing the hood, turn on/off the ignition, turn on the accessory mode.

The access controller 228 may also include an arbitration system 230. The arbitration system 230 may interface between various identification systems including the biometric system and a user interface 232 that may allow access to the vehicle 16 using a code entered at the user interface 232. The user interface 232 may be switches, dials or push buttons. The user interface 232 may also include a touch screen display. The user interface 232 allows a user to enter various data as requested such as a personal identification number.

The arbitration system 230 communicates with the various actuators through the actuator controller 234. The actuator controller 234 controls the various actuators described above. An enabling signal or disabling signal may be generated by the actuator controller 234 in response to successful arbitration for identifying the role and function being requested by the user.

An RF system 236 is also disposed within the access controller 22. The RF system 236 allows control to a user or user device when a RF sensor ultra-wideband or Bluetooth low energy (BLE) system is used as an identifying system.

The vehicle 16 may have a microprocessor or processor 240 and a memory 242 associated therewith. The microprocessor or processor 240 is used to perform different functions and comparisons as described above. The memory 242 may save data that is used in the comparison such as alphanumeric identifiers, biometric information and the like. The memory 242 is a non-transitory, computer-readable medium including machine-readable instructions that are executable by the processor. The machine-readable instructions allow control of the identity system. The processor 240 is illustrated outside the access controller. However, the access controller 22 may include the processor 240 or utilize the microprocessor 240.

Figure 3:
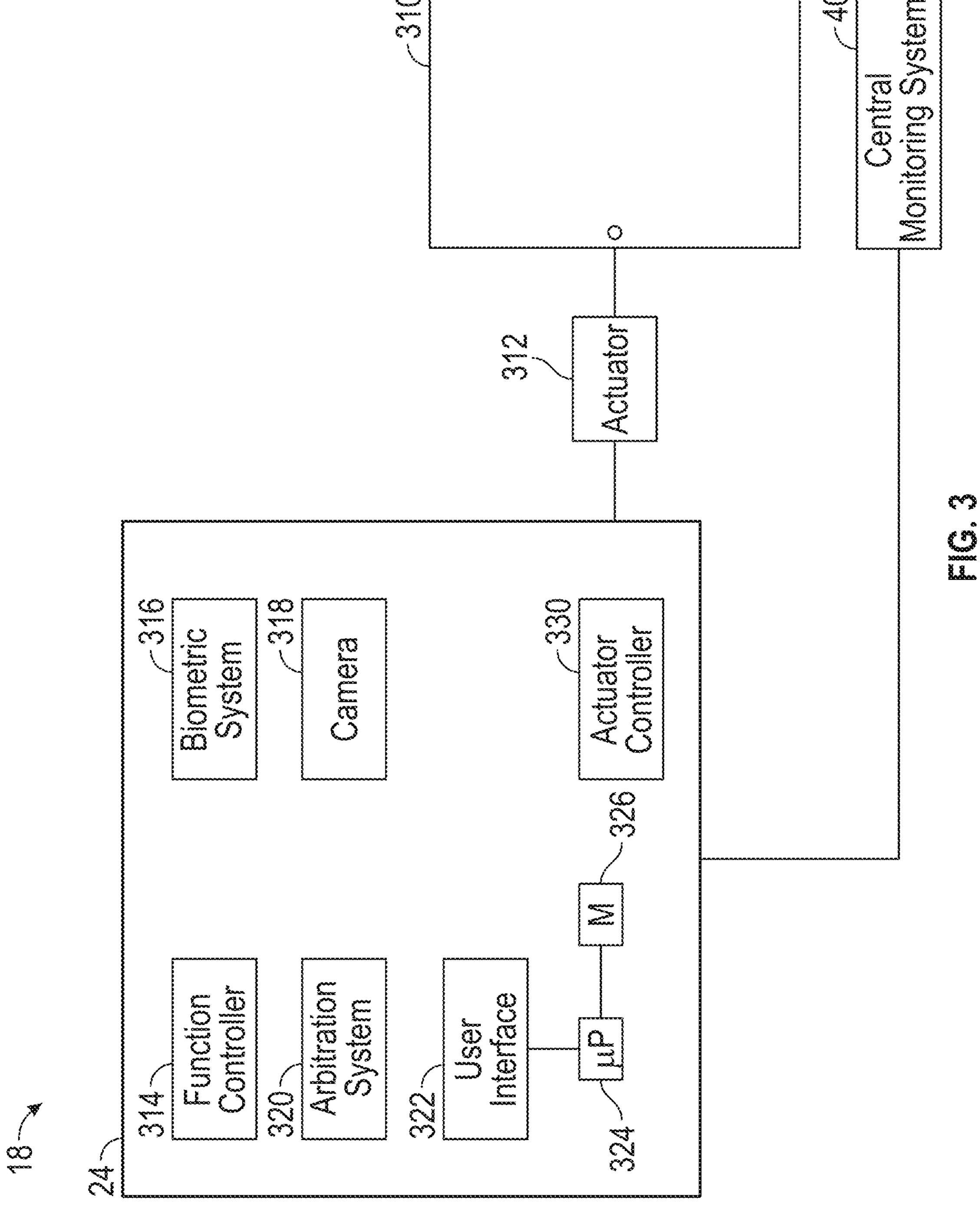
FIG. 3 is a block diagrammatic view of a building identity system.

Referring now to FIG. 3, the building 18 has the access controller 24 that is used for controlling access to various locations or systems of the building. The locations may include areas enclosed or separated by a door 310. The door 310 may be an access door suitable for use by a person. However, the access door 310 may provide access to various storage closets, compartments or equipment within the building 18. The access controller 24 provides access to the building location through an actuator 312. The actuator 312 may be a door lock, motor associated with the door lock or other security device or a door closer. The access control 24 has various functions similar to those described above with respect to the vehicle. The access controller 24 includes a function controller 314 for controlling various functions within the building 18. The function controller 314 may control various systems or access to various system, storage areas, rooms or areas of the building. A biometric system 316 associated with a camera 318 may also be set forth. The biometric system 316 may operate in a similar manner to the biometric system of the access controller 22 of the vehicle 16. The camera 318 may also be used for biometrics as mentioned above. However, the camera 318 may be part of a security system that allows monitoring and recording of various movements continuously or based upon motion control of various areas within the building 18.

The access controller 24 includes an arbitration system 320 that operates in a similar manner to the arbitration system described above relative to FIG. 1. The arbitration system 320 allows access to various parts of the building based upon various identification criteria for a specific function. As mentioned above, some the identification criteria may be communicated to the central monitoring device 40. A user interface 322, a microprocessor or processor 324 (inside or outside of the access controller) and a memory 326 may act in the same or similar manner to that set forth above relative to FIG. 2.

Ultimately, the arbitration system 320 is used to control an actuator controller 330 for controlling the actuator 312 of the building. The actuator control signal may be generated by the arbitration system in response to an arbitration result.

Figure 4:
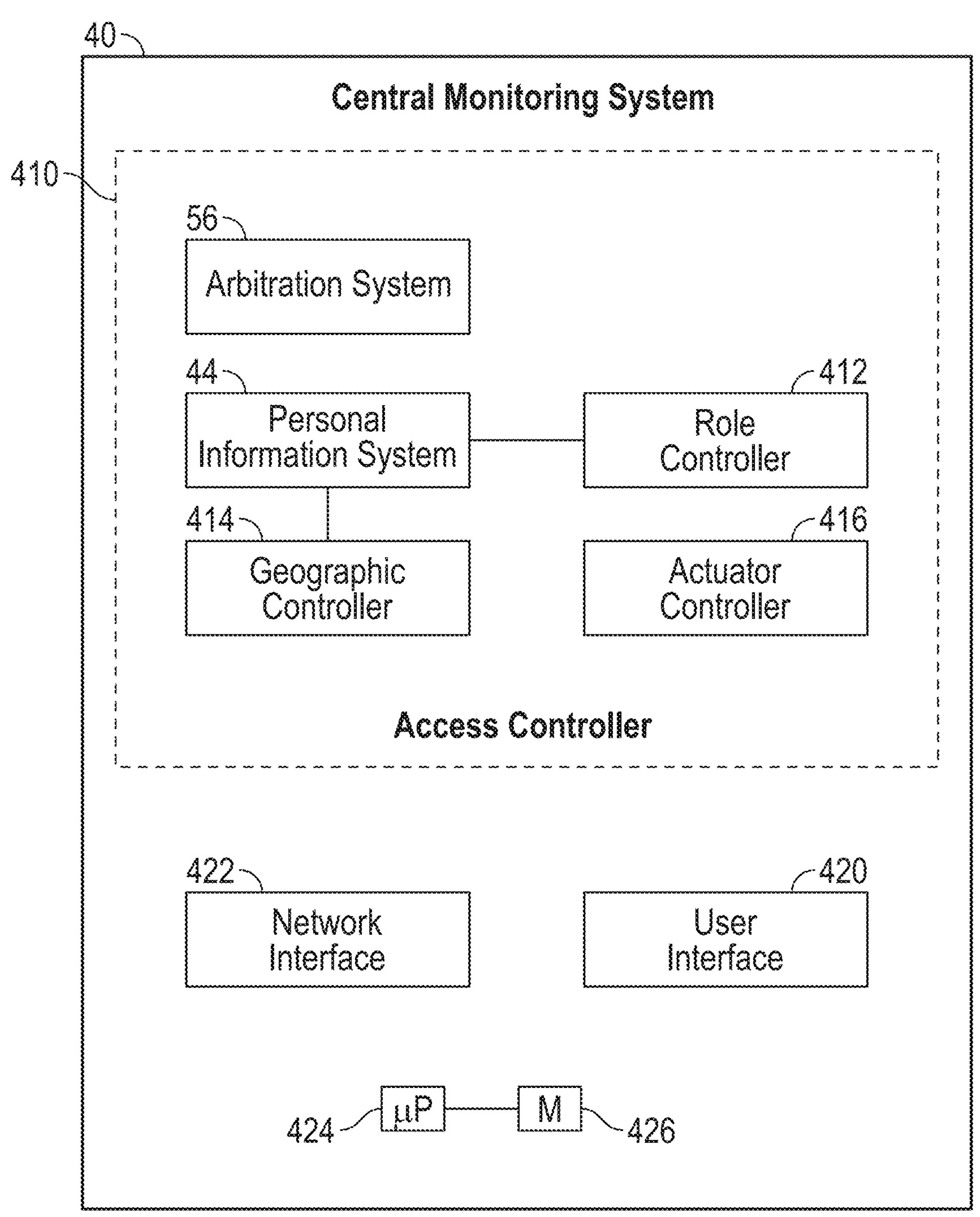
FIG. 4 is a block diagrammatic view of the central monitoring system of FIG. 1.

Referring now to FIG. 4, an access controller 410 may be included within the central monitoring system 40. The access controller 410 may include the arbitration system 56 described above. The arbitration system 56 may respond to one or more vehicles 16 or one or more buildings 18. That is, various identification signals or criteria may be communicated to the arbitration system 56 to determine whether access or a function may be achieved. The central monitoring system 40 may have the personal information system 44 disposed within the access controller 410 in contrast to the separately illustrated personal information system of FIG. 1. The personal information system 44 may be associated with a role controller 412. The role controller 412 may be controlled with a user interface 420 disposed within the central monitoring system 40 or by a role assignment manager 42 located in the same or a different location as the central monitoring system 40. A geographic controller 414 may be used to control the limits of a vehicle in a similar manner to the geographic limiter 216 of the vehicle 16. That is, the geographic controller 414 may enable or disable certain functions based upon the geographic or global position based on the role of the user.

An actuator controller 416 may be associated with the access controller 410. The actuator controller 416 may act in accordance with the actuator controllers 234 and 330 described above. However, the actuator controller 416 may be in a remote location and thus communicate through a network to generate an actuator signal for controlling an actuator to allow or disallow access to a particular item being controlled such as the vehicle functions or building functions. The actuator controller 416 and other functions of the access controller 410.

The central monitoring system 40 also includes a user interface 420 and a network controller 422 that act in a similar manner to that described above. The user interface 420 may be one of the variety of different types of user interfaces. Likewise, the network interface 422 may be used for communicating through a network as described above. The central monitoring system 40 also includes a microprocessor 424 coupled to a memory 426. The memory 426 is a non-transitory computer-readable medium that includes machine-readable instructions that are executable by the processor 424. The machine-readable instructions for controlling the central monitoring system. The processor 424 may be inside or outside the access controller 416.

Figure 5:
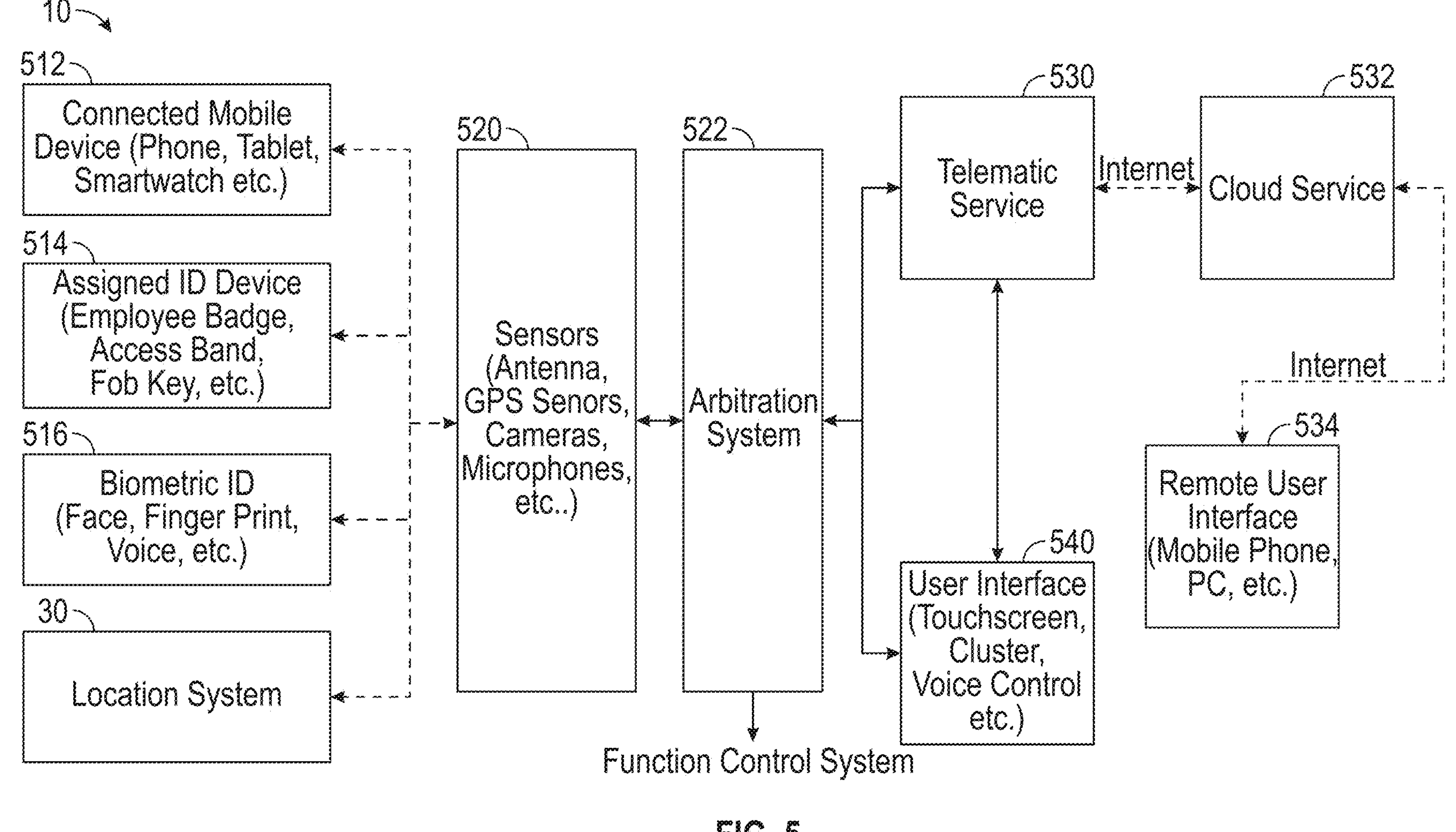
FIG. 5 is a block diagrammatic view of the overall system.

Referring now to FIG. 5, a simplified block diagrammatic system of one example of the identity system 10 is set forth. In this example, the system diagram is generic with respect to the location of the various devices. In this example, a connected mobile device 510 is provided. The connected mobile device 510 may be a phone, tablet or smartwatch. However, other types of mobile devices may be set forth. An assigned ID device 514 may also be used to identify a user. An assigned identifier device may be an employee badge, an access band, a FOB key or the like. A biometric identifier 516 includes a face identifier, a fingerprint voice or the like. The face fingerprint and voice may be stored within a personal information system associated with the central monitoring system 40 or may be provided or stored within various user devices or the vehicle or building access controllers. The location system 30 is also illustrated in FIG. 5 and acts as described above relative to FIG. 1.

A plurality of sensors 520, such as global positioning sensors, cameras, microphones and the like generate data that is communicated to the arbitration system 522. The arbitration system 522 may be one of the arbitration systems 52, 54 or 56 described above. Further, the data provided to the arbitration system 522 may be provided from the connected mobile device 512, the assigned identifier device 514, the biometric identifier 516 and the location system 30. Ultimately, the arbitration system is used to enable or disable various functions with a function control signal based on the user or user device meeting the identification criteria of the assigned role. Input to the arbitration system 522 may also be communicated through a telematic service 530. The telematic service may receive or communicate data to and from the arbitration system 522. The telematic service, for example, may communicate through a cloud service 532 which, in turn, may receive or transmit data to or from a remote user interface 534 such as mobile phone, personal computer or the like.

The arbitration system 522 may also be in communication with a user interface 540. The user interface 540 may be a touch screen, instrument cluster, voice control or the like. The arbitration system may receive various data from the user interface 540. The user interface 540 may also be in communication with the telematic service 530 for sending or receiving information through the cloud service 532.

Figure 6:
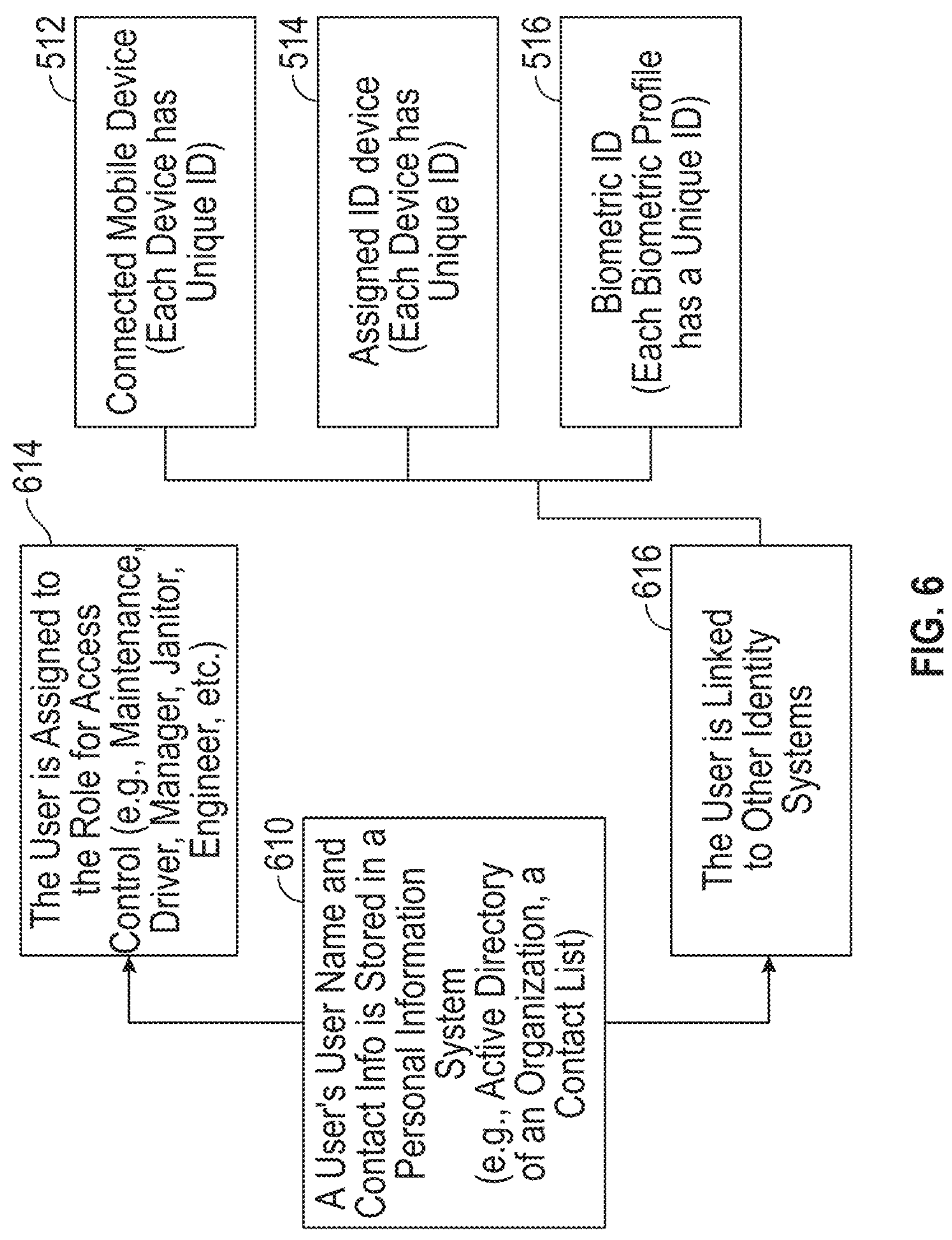
FIG. 6 is a flowchart of a method for operating the personal information system.

Referring now to FIG. 6, the operation of the personal information system 44 and the role assignment manager 42 are set forth. In block 610, a user's name and contact information are stored in the personal information system 44. The system 10 may have an active directory of an organization or a contact list or a combination thereof. In block 614, the user is assigned a role for access control. Various types of roles may have different types of functions associated therewith. For example, roles within an organization such as a maintenance person, a driver, a manager, a janitor, an engineer or a general role or other role category may also have identification criteria as mentioned above. The general role or other role may have specific functions not defined previously associated therewith. After the user's name and contact information is stored in the personal information system, block 616 links the user to various identity systems such as the connected mobile device 512, the assigned identifier device 514 and the biometric identifier device 516. When the identification criteria are met as determined by the arbitration system 522 access may be granted to the function.

Figure 7:
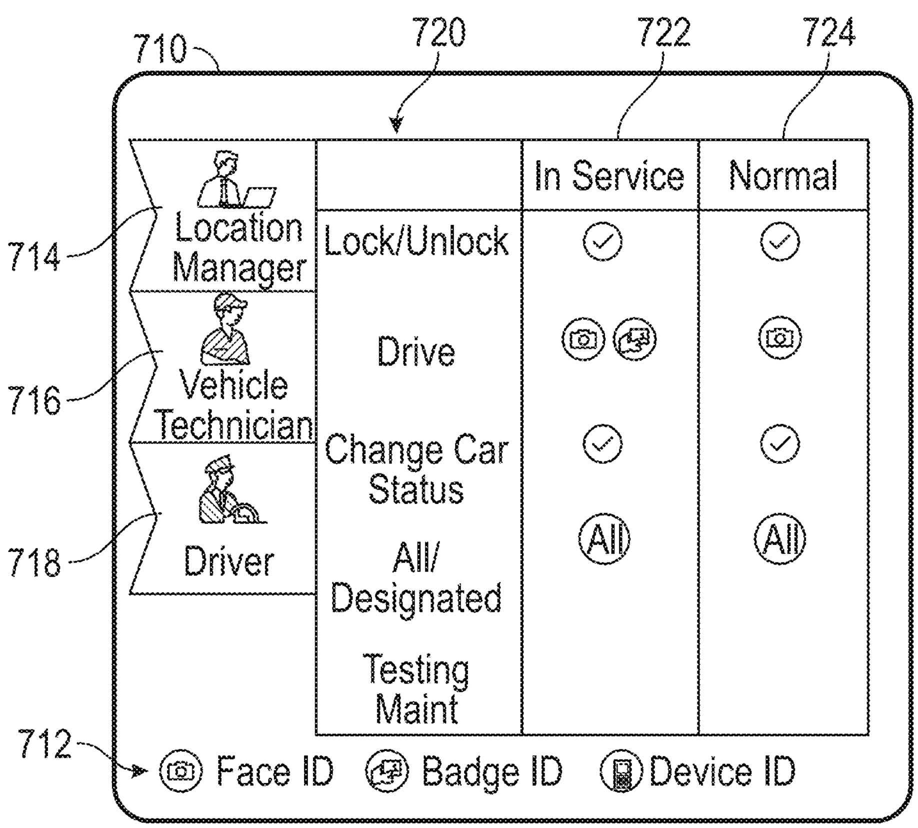
FIG. 7 is a screen display showing various roles, functions and identification criteria associated with the functions.

Referring now to FIG. 7, a screen display for a role assignment manager system 42 is set forth. In the example, a key 712 illustrates the symbols for face identification, a badge identifier and a device identifier. In this example, various types of roles such as location manager 714, a vehicle technician 716 and a driver 718 are illustrated. The three columns 720, 722 and 724 illustrate various criteria. In the first column, functions of locking and unlocking, driving and changing a car status as well as "all/designated" are set forth. Two columns 722 and 724 correspond to "in-service" and "normal". The location manager 714 is allowed to lock and unlock the vehicle in service and in normal operation. The location manager is also able to drive the vehicle when the vehicle is in service using a face identifier and a badge identifier. In normal operation, the location manager 714 may drive the vehicle using facial identification. The location manager is able to change the vehicle status when the vehicle is both in service and during normal operation. In the last row, all functions are designated to be operable by the location manager.

Figure 8:
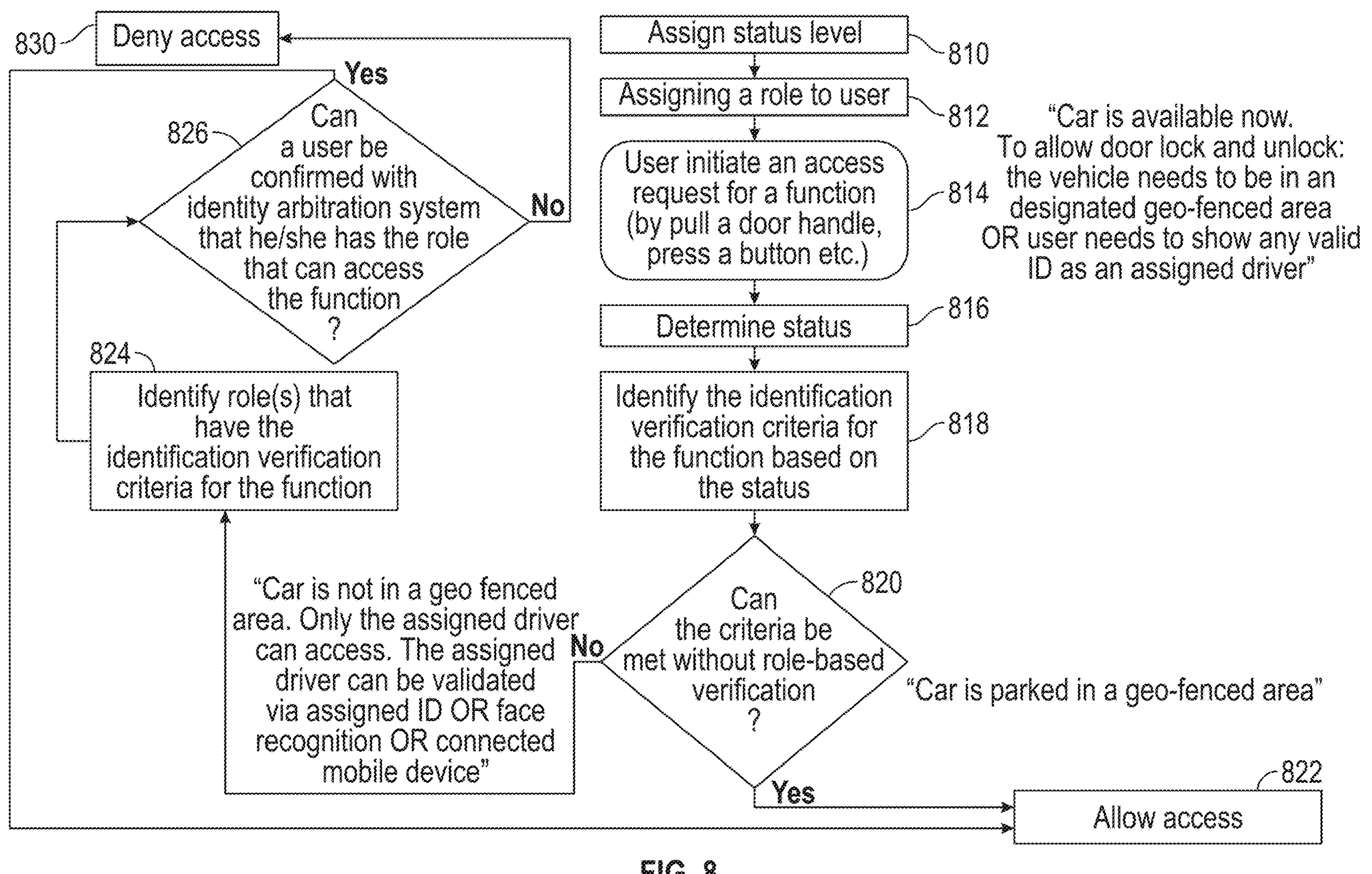
FIG. 8 is a flowchart of a method for operating and providing access rights in an authentication flow.

Referring now to FIG. 8, a flowchart for access rights authentication flow is set forth. In step 810, the vehicle statuses are assigned. The vehicle statuses may include in-service or normal operation as described above in FIG. 7. However, various types of statuses may be assigned to a vehicle. Status levels may also be assigned to various operations within a building with various status levels.

In step 812, a role or roles may be assigned to a user. A role may have various functions and various identification criteria for the function. Examples of roles include but are not limited to management roles such as a supervisor and various levels of employees therein.

In step 814, a user initiates an access request for a function. The access request may be by pulling a door handle in a building or a vehicle, pressing a button or other type of user interface or the like, approaching the vehicle and building. An access request signal is initiated by an action or access request and communicated to the access controller whether at the vehicle, building or central controller.

In step 816, the current status of the building or building location and the vehicle are determined in step 816. In step 818, the identification verification criteria for the function requested in step 814 are determined based on the status of the vehicle. The status of the vehicle may be in a geo-fenced area, driving of the like. The status of a building may be different states such as in an alarm state or other type of emergency state. By way of example for a vehicle, the car may be available, door locking and unlocking may be performed in the vehicle is in a designated geo-fence area or the user needs to show any valid ID as an assigned driver. The "assigned driver" is one role. Anyone is allowed to lock and unlock the vehicle when the vehicle is in a designated geo-fence area.

In step 820, it is determined whether the identification criteria can be met without role based verification. In step 822, it is determined that the "car is a geo-fence area". Therefore, no role needs to be determined and therefore access is allowed in step 822.

In step 820, when the criteria cannot be met without role verification, step 824 is performed. In step 824, the roles are identified and the identification verification criteria for the function is determined. That is, when the car is not in a geo-fence area, only the assigned driver can access the vehicle in this example. The assigned driver role can be validated by way of an assigned identifier or face recognition or by a connected mobile device. The arbitration system is used to form the function control signal in step 826. In step 826, the identity arbitration system is used to confirm the user attempting access has the role that corresponds to the function. When the identity arbitration system confirms that the person accessing the vehicle or the building has the role that can access the function, the identification criteria is checked and verified. By checking all of the different systems associated with the different identification criteria, the determination of the function control signal is generated to allow access to the building or function. In step 826, when the role does not correspond to the function and the identity is not proper relative to the required identity criteria, step 830 denies access to the vehicle or building. As mentioned above, access to the various functions may include unlocking or locking the doors, unlocking or locking a trunk, unlocking or locking a bulkhead, generating an initiation signal, putting the vehicle in drive gear by way of the transmission, driving out of a certain location or driving above a certain speed. Other rights may also be provided such as passive rights which enable the recording of the driver in certain conditions. For example, when the driver is an authorized driver, no recording of the driver may be performed. However, when an unidentified person is in the vehicle, the unidentified person may be recorded and communicated to a fleet staff or the role assignment manager.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:

assigning a role for a user;

assigning different identity criteria for enabling different types of functions associated with the role, at least a first function having a first and second identification criteria;

requesting access for the first function of the different types of functions of an access controller;

determining an identity of the user using the first and second identification criteria associated with the first function at an arbitration system; and allowing access based upon identifying the user when the identity corresponds to the first and second identification criteria for the role.

2. The method of claim 1 further comprising registering a user into a personal information system.

3. The method of claim 1 further comprising determining a status of a vehicle.

4. The method of claim 3 wherein selecting identification criteria for the function is based on the status of the vehicle.

5. The method of claim 3 wherein the function for the vehicle comprises unlocking or locking a door, accessing a trunk, accessing a hood, turning an ignition on/off, turn on an accessory mode, placing the vehicle in drive, and limiting a speed of the vehicle.

6. The method of claim 3 wherein determining the status of the vehicle comprises determining a location.

7. The method of claim 5 further comprising determining a status of a building controller.

8. The method of claim 6 wherein registering comprises providing a user name and contact information.

9. The method of claim 1 wherein determining the identity comprises determining the identity by arbitrating between a plurality of identification systems.

10. The method of claim 1 wherein requesting access for the function is based on at least one of pulling a door handle, approaching a vehicle or pressing a button.

11. The method of claim 1 wherein assigning a role comprises assigning a role for a vehicle based on at least one of role a manager, a driver, a vehicle technician or a general role.

12. An access controller comprising:

a processor;

a non-transitory computer-readable medium including machine-readable instructions that are executable by the processor, wherein the machine-readable instructions include:

assigning a role for a user;

assign different identity criteria for enabling different types of functions associated with the role, at least a first function having a first and second identification criteria;

receiving an access request signal for the first function;

determining an identity of the user using the first and second identification criteria associated with the first function at an arbitration system; and allowing access based upon identifying the user when the identity corresponds to the first and second identification criteria for the role.

13. A vehicle comprising:

the access controller of claim 12 wherein the instructions include:

determining a status of the vehicle, selecting identification criteria for the function based on the status of the vehicle.

14. The vehicle of claim 13 wherein the function for the vehicle comprises unlocking or locking a door, accessing a trunk, accessing a hood, turning an ignition on or off, turning on an accessory mode, placing the vehicle in drive, and limiting a vehicle speed.

15. The vehicle of claim 13 wherein the status of the vehicle comprises a location.

16. An identity system comprising:

a central controller comprising the access controller of claim 12; and a vehicle or building comprising an actuator controller controlled by the access controller of the central controller.

17. A building comprising:

the access controller of claim 12;

wherein the instructions include determining a status of a building.

18. The system of claim 13 wherein the instructions for determining the identity comprise determining the identity by arbitrating between a plurality of identification systems.

19. The access controller of claim 12 wherein the instruction for receiving the access request signal is based on at least one of pulling a door handle, approaching a vehicle or pressing a button.

20. The access controller of claim 12 wherein the instruction for assigning a role is based on at least one of a manager, a driver, a vehicle technician and a general role.

* * * * *